United States Patent [19]

Carroll

[11] Patent Number: 4,622,150

[45] Date of Patent: Nov. 11, 1986

[54] OVERFLOW OUTLET FOR A CYCLONE SEPARATOR AND METHOD OF OPERATION

[76] Inventor: Noel Carroll, Sherbrooke Road, Sherbrooke 3789, Victoria, Australia

[21] Appl. No.: 705,431

[22] PCT Filed: Jun. 1, 1984

[86] PCT No.: PCT/AU84/00097

§ 371 Date: Jan. 28, 1985

§ 102(e) Date: Jan. 28, 1985

[87] PCT Pub. No.: WO84/04702

PCT Pub. Date: Dec. 6, 1984

[30] Foreign Application Priority Data

Jun. 1, 1983 [AU] Australia .............. PF 9646/83

[51] Int. Cl.⁴ .............................................. B01D 21/26
[52] U.S. Cl. ................................... 210/739; 210/788; 210/96.1; 210/512.3
[58] Field of Search ................. 210/96.1, 512.1, 512.3, 210/923, 740, 745, 787, 788, 739; 209/211

[56] References Cited

U.S. PATENT DOCUMENTS

| | | | |
|---|---|---|---|
| 3,334,516 | 8/1967 | Cedrone | 210/512.1 X |
| 3,481,469 | 12/1969 | Walker | 210/96.1 |
| 3,515,276 | 6/1970 | Comer et al. | 210/512.1 X |
| 3,558,255 | 1/1971 | Rose | 210/96.1 |
| 4,237,006 | 12/1980 | Coleman et al. | 210/512.1 X |
| 4,239,623 | 12/1980 | Schrenker | 210/96.1 |

FOREIGN PATENT DOCUMENTS

| | | | |
|---|---|---|---|
| 35489 | 6/1981 | Australia . | |
| 2169010 | 9/1973 | France . | |
| 254791 | 1/1949 | Switzerland . | |
| 695623 | 8/1953 | United Kingdom | 210/96.1 |
| 1364943 | 8/1974 | United Kingdom . | |
| 2055633 | 3/1981 | United Kingdom . | |
| 440156 | 2/1975 | U.S.S.R. | 210/512.3 |
| 566633 | 8/1977 | U.S.S.R. . | |
| 822913 | 4/1981 | U.S.S.R. . | |
| 929235 | 5/1982 | U.S.S.R. . | |
| 929232 | 5/1982 | U.S.S.R. . | |

Primary Examiner—Richard L. Chiesa

[57] ABSTRACT

A cyclone separator (10) having an elongated tapered separating chamber (25) with tangential inlet pipes (26, 28) thereto, and overflow outlet pipe (34) at the larger diameter end of the separating chamber, for outflow of a less dense component of a liquid mixture to be separated, and an underflow outlet (23) at the smaller diameter end of the separating chamber, for outflow of the denser component of the liquid mixture to be separated. The overflow outlet pipe (34) has an orifice (77) which is variably obstructable by a valve member (80) movable lengthwise of the pipe (34), to vary the flow rate through the outlet pipe (34). The degree of contamination of the denser liquid component emerging from the underflow outlet (23) is monitored by a detector (118) which is connected to a control circuit (108) which controls a motor (110). Motor (110) is coupled to valve member 80 whereby to move the valve member towards and away from the orifice (77), whereby to decrease the flow through outlet pipe (34) when the contamination level drops and to increase flow when the contamination level rises. A further control circuit (140) coupled to detector (118) is effective to control valves (102, 104) whereby to recycle the denser liquid component through the separator in the event that the contamination level is determined to be above a predetermined level.

18 Claims, 8 Drawing Figures

OVERFLOW OUTLET FOR A CYCLONE SEPARATOR AND METHOD OF OPERATION

This invention relates to a cyclone separator for separating liquid components in a liquid mixture and having an elongate tapered separating chamber with at least one side inlet for liquid to be separated and an overflow outlet opening at a larger cross sectional end of the separating chamber, for outflow of the less denser of said components, the separating chamber also having an underflow outlet at the smaller cross sectioned end of the separating chamber, for outflow of the denser of said components. The invention is particularly, but not exclusively concerned with separators of this kind and which are specifically adapted for separating oil and water.

U.S. Pat. No. 4,237,006 (Colman et al) describes a cyclone separator of the above kind, the separating chamber having first, second and third contiguous cylindrical portions arranged in that order, the first cylindrical portion being of greater diameter than the second cylindrical portion and the third cylindrical portion being of lesser diameter than the second cylindrical portion, the overflow outlet of the separator communicating with the first cylindrical portion at the end thereof opposite to said second cylindrical portion and there being a plurality of and a plurality of tangentially directed feed inlets communicating with the first cylindrical portion. My International Application PCT/AU83/00028 entitled "Cyclone Separator" and filed Feb. 28, 1983 also describes a similar type of separator.

It has been found that the selection of the cross sectional area of the overflow outlet is critical for proper performance of the separator, but that a cross sectional area which is suitable for some operating conditions may not be suitable for other operating conditions. Thus, when the separator is used in an environment where the operating conditions vary, inadequate separation may be achieved, with substantial contamination of, say, the emergent denser liquid component due to presence of excessive amounts of the less dense component. These variations may, for example, occur due to variations in the proportions of the two components in the mixture supplied to the separator for separating, or by variations in flow rate through the separator.

In accordance with one aspect of the invention, there is provided a cyclone separator as first above described wherein valve means is provided operable to effect variable restriction of flow from the separator via said overflow outlet opening. Preferably, the overflow outlet presents an orifice through which liquid flow from the overflow outlet occurs in use of the separator and the valve means comprises a member such as a needle member movable to variably obstruct the orifice.

Where the overflow outlet presents a stepped bore having a first bore portion adjacent the first cylindrical portion, the stepped bore may be configured as described in my international application PCT AU83/00028.

The invention is further described by way of example only with reference to the accompanying drawings in which.

Figure 1:
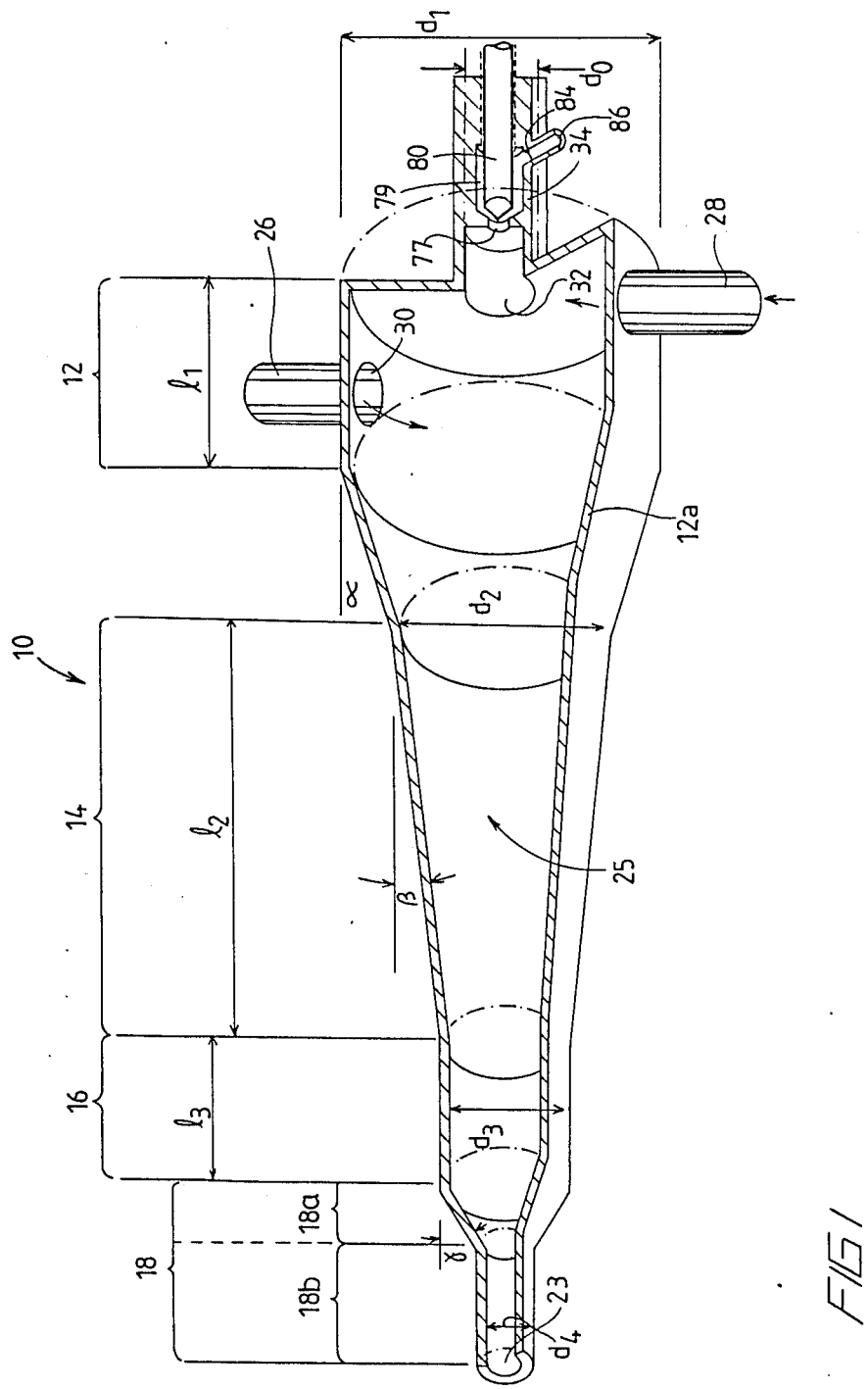
FIG. 1 is a perspective view, partly sectioned, of an exemplary cyclone separator which the invention is applicable.
Figure 2:
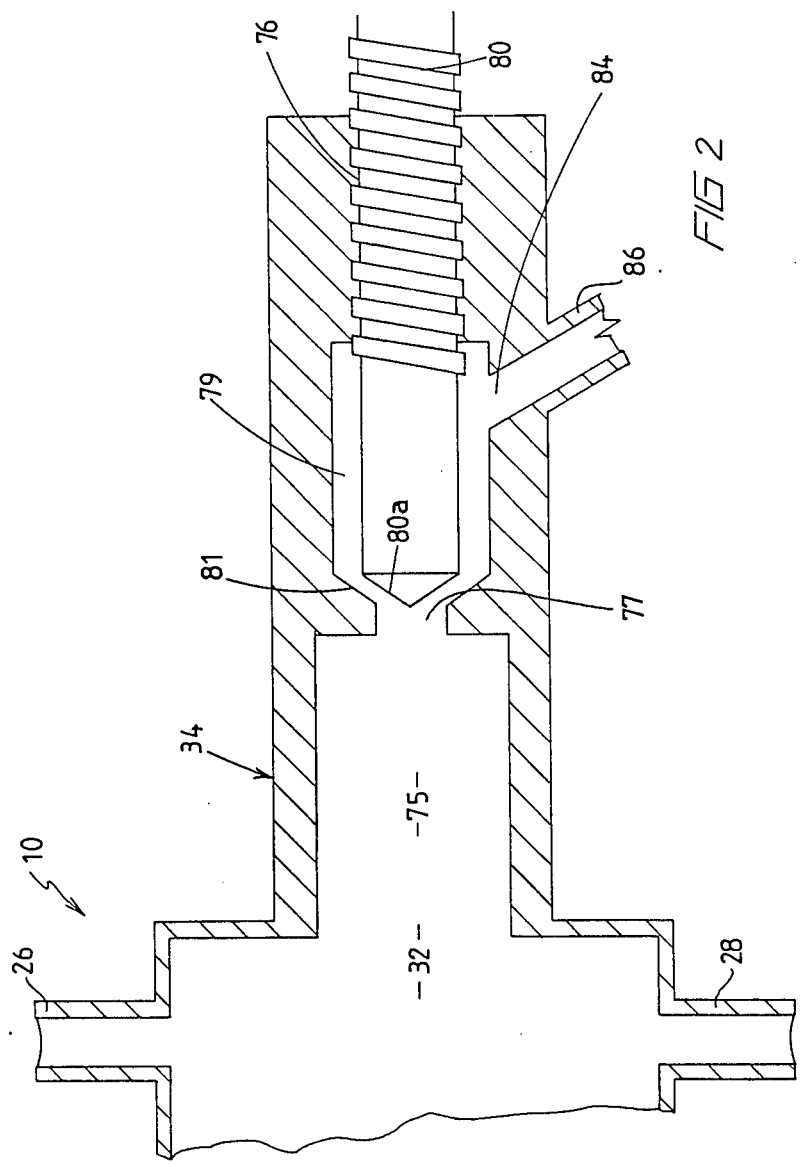
FIG. 2 is an enlarged fragmentary cross-sectional view of the overflow outlet of the separator of FIG. 1.
Figures 4, 5:
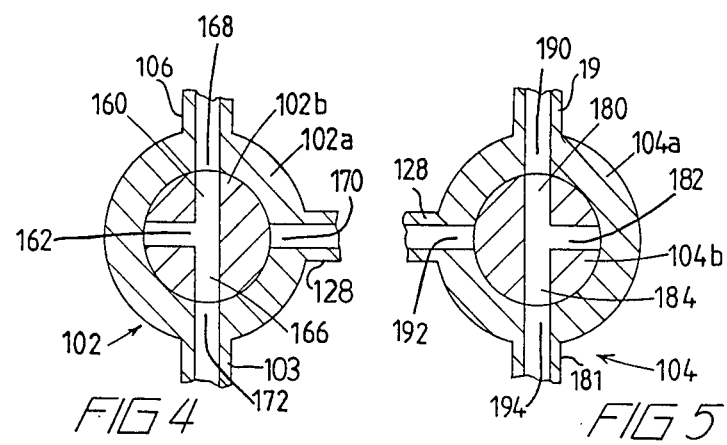
FIGS. 4 and 5 are diagrammatic cross sections of valves incorporated into the control means of FIG. 3, and showing conditions of the valves prevailing in one operative condition of the control means.
Figures 6, 7:
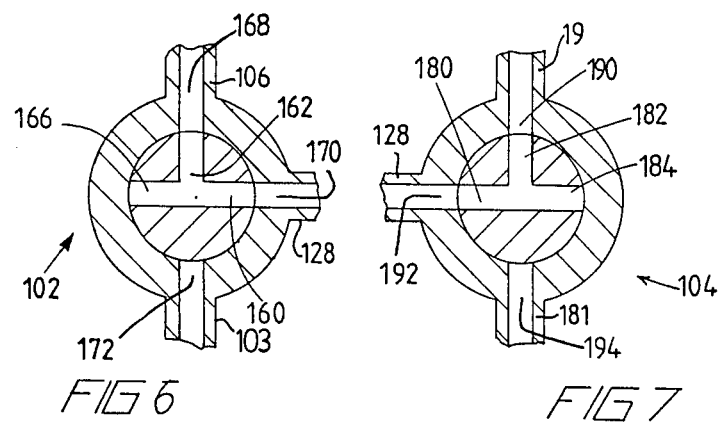
Figure 8:
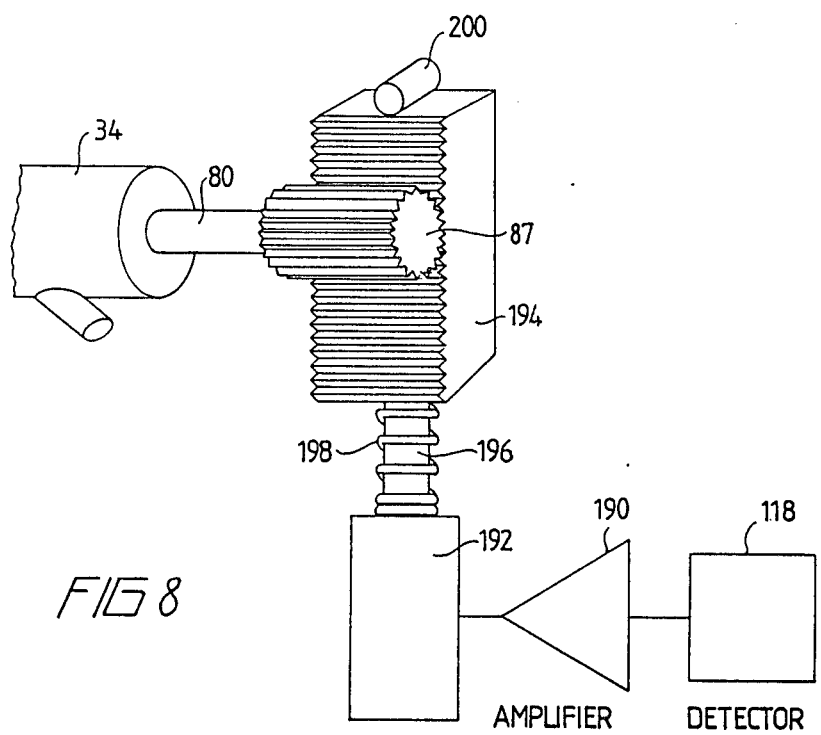

FIGS. 6 and 7 are diagrammatic cross sections like FIGS. 4 and 5 respectively, but showing the valves in conditions prevailing in another operative condition of operation of the control means; and FIG. 8 is a diagram showing a modified control means useful in the separator of FIGS. 1 and 2.

The separator 10 shown in FIG. 1 has a separating chamber 25 having first, second and third cylindrical portions 12, 14 and 16 coaxially arranged in that order. These cylindrical portions are generally similar to the corresponding first, second and third cylindrical portions of the separating chamber of the cyclone separator described in the aforementioned U.S. Pat. No. 4,237,006, the disclosures of which are hereby incorporated into the present specification to form part thereof. Most particularly, the first cylindrical portion 12 has two feed pipes 26, 28 associated therewith, these being arranged to feed tangentially into the cylindrical portion 12 via respective inlet apertures of which only one aperture, namely aperture 30 associated with pipe 26, is visible in the drawing. The two feed inlet apertures are diametrically arranged one relative to the other and positioned close to the end of portion 12 remote from portion 14. The end of portion 12 remote from portion 14 also has a circular outlet opening 32 which leads to an overflow outlet pipe 34.

Cylindrical portion 12 is connected to portion 14 by a part 12a of the separating chamber 25 exhibiting a taper towards the second cylindrical portion 14. As explained in U.S. Pat. No. 4,237,006 however, such tapered part is not essential.

The second cylindrical portion 14 exhibits a taper over its length, tapering from a diameter at the end adjacent portion 12 equal to the diameter of portion 12 at the junction between the two portions to a somewhat lesser dimension at its opposite end. Cylindrical portion 16 is of constant diameter equal to the minimum diameter of portion 14.

In the drawing, the length 1 of portion 12, its diameter $d_1$, the taper angle $\alpha$ of the part 12a, the internal diameter $d_0$ of the outlet pipe 34, the length and diameter $l_2$, $d_2$ of the second portion 14, the taper angle $\beta$ of the second portion 14 and the length $l_3$ and diameter $d_3$ of the third cylindrical portion, as well as the total area $A_i$ of the two feed inlet apertures 30 may all be selected in accordance with the parameters mentioned in U.S. Pat. No. 4,237,006. These constraints are:

$10 \leq l_2/d_2 \leq 25$ $0.04 \leq 4A_i/\pi d_1^2 \leq 0.10$ $0.1 \leq d_0/d_2 \leq 0.25$ $d_1 > d_2$ $d_2 > d_3$ It has not been found always essential to adhere to these constraints however. For example the outlet diameter $d_0$ need not be constrained to be within limits as described therein.

A fourth portion is added to the separating chamber 25, this portion being designated by reference numeral 18 in the figure. Portion 18 has a part 18a adjacent portion 16 which is of frustoconical configuration, tapering from a maximum diameter equal to $d_3$ at its end closest to and adjoining to the outlet end of cylindrical portion 16, to a diameter $d_4$ at its outlet end. At the outlet end of part 18a, fourth portion 18 includes an outlet pipe 18b which is of internal diameter $d_4$.

Preferably, the angle $\gamma$, being the conicity or half-angle of the frustoconical surface of part 18a is about 45°, although angles in the range 30° to 60° are generally satisfactory. Various alternative forms for the portion 18 including part 18a and pipe 18b are described in the specification of my International Patent Application PCT/AU83/00028, the disclosures of which are hereby incorporated to form part of the present specification.

In use, liquid to be separated is admitted tangentially to the interior of cylindrical portion 12 via feed pipes 26, 28, the denser component of the liquid then travelling lengthwise through the separator to emerge from pipe 18b, whilst the lighter component emerges from pipe 34. The pipe 18b thus defines, at the end remote from part 18a, an underflow or denser liquid outlet 23. A pump 220 such as a conventional piston pump operates to effect admission of the liquid to be separated, via a line 106.

The overflow outlet pipe 34 is shown in more detail in FIG. 2 as having a stepped interior bore leading from outlet opening 32. More particularly, the bore has a first portion 75 adjacent outlet 32 and of diameter equal to the diameter of outlet 32, and a second portion defining an orifice 77 at the end of bore portion 75 remote from outlet 32, orifice 77 being of lesser diameter than bore portion 75. Orifice 77 leads, at the side thereof remote from bore portion 75, to an enlarged chamber 79. Chamber 79 defines a frustoconical seating surface 81 around the orifice 77. At the end of chamber 79 remote from orifice 77, the pipe 34 is provided with a threaded bore 76 and a needle valve member 80 is threadedly received therein so as to extend from the exterior of the pipe 34 into the chamber 79. Chamber 79 is substantially closed at the end remote from orifice 77, by virtue of the positioning of the member 80 within bore 76. However chamber 79 is open sidewardly, via an outlet 84, leading to an outlet line 86. The valve member 80 is movable, by rotating the valve member in the threaded bore 76, between a position at which a frustoconical end surface 80a thereof engages seating surface 81 to close off orifice 77 and a position at which the member 80 is withdrawn to correspondingly move end surface 80a away from the orifice 77 to allow free communication of liquid from bore portion 75 into chamber 79 via the orifice 77, for exit from the chamber 79 via outlet 84 and line 86.

By the above described means, the cross sectional area presented for liquid outflow from the overflow outlet may be varied by turning the valve element 80 to vary the position of the surface 80a thereof relative to the valve seating surface 81. It has been found desirable to effect such variation in order to enable proper control of the operation of the cyclone separator when in use. For example when the separator is used for separating oil and water, the quantity of oil remaining in the water emerging from the denser liquid outlet 23 may be varied by varying the position of valve member 80. In practice, it has been found that it is desirable to control the position of the member 80 in a fashion such that, when a greater quantity of oil than is desirable is present in water emerging from outlet 23, the member 80 is turned to withdraw it away from valve seat 81, that is to say to increase the cross sectional area for liquid flow from the outlet 32 and outlet pipe 34 when oil content in the emergent water is found to have increased.

Figure 3:
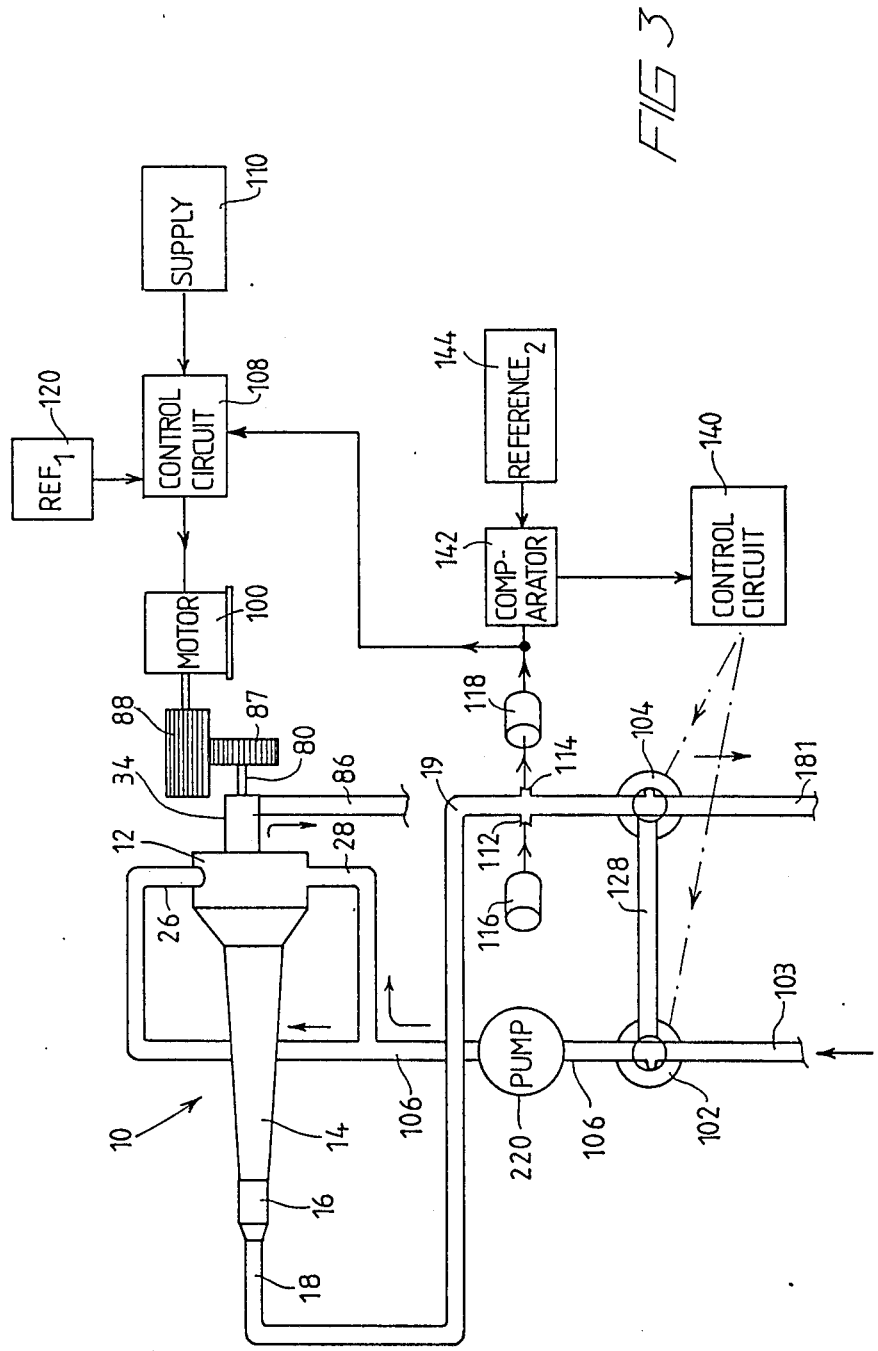
FIG. 3 is a diagram showing control means useful with the separator of FIGS. 1 and 2.

FIG. 3 shows the separator 10 interconnected into a control system for automatic regulation of the position of the member 80. More particularly, the member 80 is in this case connected to a gear 87 which meshes with another gear 88 on the output shaft of an electric motor 100. Motor 100 is operated under control of a control circuit 108 from an electric current supply 110. The denser liquid or water outlet 23 of the separator is connected to a discharge pipe 19 provided with two opposed windows 112, 114 whereby to permit light from a laser beam source 116 to be passed transversely across the pipe from one window 112 to exit via the other window 114. A detector 118 is arranged to receive such transmitted light and to generate an electric signal proportional to the magnitude of the light intensity so detected. Detector 118 is connected to circuit 108 so that the output signal from the detector is in use compared with a fixed signal provided from a reference generator 120. The amount of light received by the detector 118 is dependent upon the quantity of oil in water passing out through pipe 19, decreasing with increase in oil content. The control circuit 108 operates to apply no electric supply to motor 100 from supply 110 in the event that the magnitude of the signal from detector 118 is determined, by comparison with the signal from the reference generator 120, to be representative of presence of a desired level of oil contamination in the oil flowing through pipe 19. In the event that the magnitude of the signal from detector 118 should fall, indicating a rise in oil content, control circuit 108 operates to apply power to motor 100 whereby to turn the gears 88 and 87 in a direction causing withdrawal of member 80 away from orifice 77 by a predetermined amount. Similarly, in the event that the signal generated by detector 118 should rise, indicating a lesser quantity of oil than the aforementioned predetermined level, the control circuit 108 operates motor 100 whereby to drive the member 80 in the direction towards the orifice 77.

In the modified arrangement of FIG. 8, the signal from detector 118 is amplified by an amplifier 190 and used to energise a solenoid 192 which has a toothed rack 194 attached to its plunger 196. Rack 194 meshes with gear 87 so as to drive the gear when the plunger 196 and rack are moved axially. The plunger is biased by a spring 198 to an extended rest position established by engagement of the rack with a fixed stop member 200. In use, the rack 194 and plunger 196 assume a rest position conditional on the degree of energisation of solenoid 192. That is to say, the current flow through the solenoid coil is increased on rise in such current due to increase in signal from detector 118 occurring when the opacity of liquid passing through pipe 19 drops so that a greater force is exerted on the plunger 196 to draw the plunger into the solenoid until a new rest state is reached at which the increased force is balanced by corresponding increased resilient bias provided by the spring 198. Similarly a decrease in signal from detector 118, caused by increased opacity of the liquid in pipe 19 weakens the force applied to the plunger 196 to effect movement of the plunger outwardly of solenoid 192 to establish a new equilibrium position. These movements of the plunger are translated to cause corresponding rotation and thus lengthwise movement of the member 80 to cause the member to move towards orifice 77 when the detected oil content decreases and to move away from the orifice 77 when the detected oil content increases.

Reverting again to FIG. 3, two valves 102, 104 are shown arranged respectively in a line 106 supplying liquid to be separated to the inlet pipes 26, 28 and in the pipe 19. Valves 102, 104 are interconnected by a recycling line 128. Valves 102, 104 are operated under control of a control circuit 140 which is connected to a comparator 142 receiving, the output from detector 118 and also receiving a fixed reference signal from a reference generator 144.

As shown in FIGS. 4 and 6, valve 102 comprises a hollow cylindrical body 102a within which is arranged a rotatable cylindrical member 102b. Member 102b has internal passageways therein providing communication to and between three peripherally spaced ports 160, 162 and 166 thereof. Body 102a has three peripherally spaced ports 168, 170, 172 communicating, respectively, with line 106, line 128 and an input line 103 (for inlet of liquid to be separated via the valve to line 106). As shown in FIGS. 5 and 7, valve 104 comprises a hollow cylindrical body 104a having a rotatable cylindrical member 104b therein. Member 104b has internal passageways therein providing communication to and between three peripherally spaced ports 180, 182 and 184 thereof. Body 104a has three peripherally arranged ports 190, 192, 194 communicating, respectively, with pipe 19, line 128 and a line 181 leading to an outlet from the apparatus.

Under the condition where the output from detector 118 is greater than a predetermined level, indicative of less than a predetermined proportion of oil in water emerging from pipe 19, control circuit 140 operates to condition the valves 102, 104 as shown in FIGS. 4 and 5. More particularly, member 104b is positioned so that port 180 is aligned with port 190 and port 184 is aligned with port 194, whilst port 192 is closed by the member 104b and port 182 is closed by engagement with the interior wall of the body 104a. Also, valve 102 has its valve member 102b positioned so that port 160 communicates with port 168 and port 166 communicates with port 172 whilst port 170 is closed by the peripheral side wall of member 102b and port 162 is closed by the interior surface body 102a. Thus, flow of separated water from separator 10 can occur from pipe 19 through ports 190, 180, 184, 194 to line 181. Similarly, oily water to be separated can enter the separator through line 103, passing through ports 172, 166, 160, 168 of valve 102 to line 106, whilst flow to or from line 128 is blocked. In this condition, the separator operates normally.

In the event that the signal from detector 118 should drop below a predetermined value as set by reference generator 144 (indicative of a proportion of oil in the water emerging from pipe 19 greater than the aforementioned predetermined value), comparator 142 operates to condition circuit 140 for movement of the valves 102, 104 to condition them as shown in FIGS. 6 and 7. In this condition, ports 180, 182 respectively provide communication to ports 192, 190 in valve 104 so that line 128 and pipe 19 are in communication. Port 184 and port 194 of valve 104 are then blocked. On the other hand, valve 102 is then conditioned so that ports 160, 162 respectively communicate with ports 170 and 168, and so that lines 128 and 106 are connected together. Port 166 of valve 102 is then blocked as is port 172. Thus line 103 is also blocked. In this case, then, water emerging from outlet pipe 23 travels down pipe 19 through valve 104 along line 128 to be readmitted to the separator via line 106, pump 220 and feed pipes 26, 28. Thus, in the event that the oil content in the emergent water from the separator exceeds the predetermined level established by the signal from reference generator 144, the water emerging from the water outlet 23 of separator 10, instead of being discharged via line 181 is recirculated for further separation. When comparator 142 indicates that the water emerging from outlet 23 has a sufficiently low oil contamination level, the control circuit 140 reverts the valves to the position shown in FIG. 4 for normal operation.

The described construction has been advanced merely by way of explanation and many modifications may be made thereto without departing from the spirit and scope of the invention as defined in the appended claims.

I claim:

1. A cyclone separator for separating liquid components in a liquid mixture and having an elongate tapered separating chamber with at least one side inlet for liquid to be separated and an overflow outlet opening at a larger cross-sectional end of the separating chamber, for outflow of the less dense of said components, the separating chambr also having an underflow outlet at the smaller cross-sectional end of the separating chamber, for outflow of the denser of said components, and valve means operable to effect variable restriction of flow from the separator via said overflow outlet opening, said separator having a control system coupled to said valve means to effect said variable restriction of flow, the control system including a contaminant sensor positioned exteriorly of said separating chamber to receive and monitor the level of contamination of the denser of said separated components, emerging from said underflow outlet, by presence of the less dense component therein, said system varying said restriction to flow from the overflow outlet in accordance with variations in said measured level of contamination, whereby to tend to minimize said level of contamination.

2. A cyclone separator as claimed in claim 1 wherein said overflow outlet opening is defined by an overflow outlet pipe which presents an orifice through which liquid flow from the overflow outlet opening occurs in use of the separator, and the valve means comprises a member movable to effect variable restriction of the orifice.

3. A cyclone separator as claimed in claim 2 wherein said member is movable towards and away from the orifice to effect said variable restriction.

4. A cyclone separator as claimed in claim 3 wherein said orifice is provided in a chamber within said overflow pipe, said member extending into said chamber towards said orifice.

5. A cyclone separator as claimed in claim 4 wherein said chamber has a side exit opening for liquid which passes from said separating chamber through said orifice.

6. A cyclone separator as claimed in claim 5 wherein said overflow outlet opening communicates with said separating chamber and with a first bore portion of said overflow pipe, said orifice being defined in an end of said first bore portion remote from the overflow outlet opening.

7. A cyclone separator as claimed in claim 6 wherein said chamber is formed as a second bore portion in said overflow outlet pipe concentric with said first bore portion and is of lesser diameter than said first bore portion.

8. A cyclone separator as claimed in claim 7 wherein said orifice is circular in cross section and is arranged coaxially with the axis of said chamber and said first bore portion and said member is defined as a needle member coaxially movable lengthwise of said chamber, orifice and first bore portion.

9. A cyclone separator as claimed in claim 8 wherein said needle member is threaded and is threadedly received in a threaded bore extending through an end of the overflow outlet pipe, whereby to be rotatable to effect movement of the needle member towards and away from the orifice.

10. A cyclone separator as claimed in claim 9 wherein said orifice has at the end thereof within said chamber a surrounding concave frustoconical valve seat and the needle member has at its end an end surface of complementary configuration whereby to seal said orifice when said needle member is moved to bring said end surface and valve seat together.

11. A cyclone separator as claimed in claim 1 wherein said system acts to increase flow from said overflow outlet opening on detection of an increase in said contamination of said denser components by said less dense component and to decrease said flow on detection of a decrease in contamination.

12. A cyclone separator as claimed in claim 11 wherein by-pass means is provided, sensitive to contamination of said denser component as separated by said separator, by said less dense component, to effect recycling of such contaminated denser component through the separator.

13. A cyclone separator as claimed in claim 12 wherein said by-pass means comprises valve means operating, on said contamination being sensed to be above a predetermined level, to divert flow from said underflow outlet back into said inlet.

14. A method of controlling a cyclone separator separating liquid components in a liquid mixture and having an elongate tapered separating chamber with at least one side inlet for liquid to be separated and an overflow outlet opening at a larger cross-sectional end of the separating chamber, for outflow of the less dense of said components, the separating chamber also having an underflow outlet at the smaller cross-sectional end of the separating chamber, for outflow of the denser of said components, and valve means operable to effect variable restriction of flow from the separator via said overflow outlet opening, the method comprising measuring, by the use of a contaminant sensor positioned exteriorly of said separating chamber, the level of contamination of the denser of said separated components, emerging from said underflow outlet, by presence of the less dense component therein, and operating said valve means to effect said variable restriction of flow the overflow outlet in accordance with variation in said measured level of contamination, whereby to tend to minimize the level of contamination.

15. A method as claimed in claim 14 wherein said liquid mixture comprises a mixture of oil and water wherein said measuring comprises measuring the amount of oil in water emerging from said underflow outlet opening.

16. A method as claimed in claim 15 wherein said valve means is operated to increase flow from said overflow outlet opening, on detection of an increase in said contamination, and to decrease said flow on detection of a decrease in said contamination.

17. A method as claimed in claim 15 including recycling said denser separated component through the cyclone separator on detection of a greater than desired level of contamination of that component by presence of the less dense component therein.

18. A method as claimed in claim 16 including recycling said denser separated component through the cyclone separator on detection of a greater than desired level of contamination of that component by presence of the less dense component therein.

* * * * *